US005704625A

United States Patent [19]
Presnell et al.

[11] Patent Number: 5,704,625
[45] Date of Patent: Jan. 6, 1998

[54] TRASH CONTAINER CARRIER

[75] Inventors: Donald C. Presnell, Stephens City; Carl R. Schulz, Winchester; Robert J. Tokash, Stephens City, all of Va.; Brett Severance, Ann Arbor, Mich.; Joel Wittkamp, Raleigh, N.C.

[73] Assignee: Rubbermaid Commercial Products Inc., Winchester, Va.

[21] Appl. No.: 699,605

[22] Filed: Aug. 19, 1996

Related U.S. Application Data

[63] Continuation-in-part of Ser. No. 595,805, Feb. 2, 1996, abandoned.

[51] Int. Cl.$^6$ ........................................................ B62B 3/02
[52] U.S. Cl. .......................... 280/79.2; 280/79.5; 220/23.4
[58] Field of Search ........................... 206/504; 220/23.4; 280/79.2, 79.5, 47.35, 47.34, 413, 79.11

[56] References Cited

U.S. PATENT DOCUMENTS

| D. 327,756 | 7/1992 | Klein et al. |
| 926,288 | 6/1909 | Rice |
| 3,031,207 | 4/1962 | Bard |
| 3,092,282 | 6/1963 | Tantlinger et al. ............... 220/23.4 |
| 3,208,768 | 9/1965 | Hulbert |
| 3,366,396 | 1/1968 | Hardy |
| 3,689,106 | 9/1972 | Young |
| 3,802,717 | 4/1974 | Eitreim |
| 3,904,218 | 9/1975 | Kostle |
| 4,103,919 | 8/1978 | Greenheck |
| 4,127,202 | 11/1978 | Jennings et al. |
| 4,203,609 | 5/1980 | Mitchell et al. |
| 4,222,580 | 9/1980 | Krokonko |
| 4,313,612 | 2/1982 | Rubens |
| 4,930,653 | 6/1990 | Machado |
| 5,005,729 | 4/1991 | Hollman |
| 5,052,703 | 10/1991 | Bertrand |
| 5,074,572 | 12/1991 | Delmerico et al. |
| 5,110,147 | 5/1992 | Gershman |
| 5,129,535 | 7/1992 | Hradisky |
| 5,181,297 | 1/1993 | Andrews et al. |
| 5,184,836 | 2/1993 | Andrews, Jr. et al. |

OTHER PUBLICATIONS

Sell sheet, Trolley; Hammerlit GmbH, 26762 Leer, Postfach 12 28. Published at least as early as Oct., 1995.
Sell sheet, Trolley; Schlosser & Co., GmbH Industriestr. 39, 8062 Markt Inderdorf. Published at least as early as Oct., 1995.
PP. 8 and 9, Dollies; Continental Manufacturing Company, 123 Byassee Drive, Hazelwood, Missouri 63042. Published at least as early as Oct., 1994.
Catalog page, Dolly; Tucker Housewares, 25 Tucker Drive, Leominster, Massachusetts 01453. Published at least as early as May, 1994.

*Primary Examiner*—Brian L. Johnson
*Assistant Examiner*—Avraham Lerner
*Attorney, Agent, or Firm*—Richard B. O'Planick; Lisa B. Riedesel

[57] ABSTRACT

A carrier including a platform body for supporting a refuse container having a base, first and second side walls and a generally tapered front wall; and including interlocking members which assist in securing together the carrier and a like carrier, wherein the interlocking members may be separated in response to pressure on a foot pedal secured to the carrier.

26 Claims, 11 Drawing Sheets

TRASH CONTAINER CARRIER

BACKGROUND OF THE INVENTION

This Application is a continuation-in-part of our U.S. patent application Ser. No. 08/595,805, filed Feb. 2, 1996, now abandoned.

1. Field of the Invention

The subject invention relates generally to a refuse container carrier or dolly having ramp means disposed between upwardly extending side walls, and more specifically to an interlocking and latching mechanism which allows several like carriers or dollies to be easily secured together and moved as one cohesive unit.

2. The Prior Art

Conventional refuse container carriers or dollies typically are circular and have a generally flat bottom for supporting a variety of sized refuse containers. The carriers or dollies may also contain a variety of attachment means for assisting in retaining a variety of sized refuse containers. Other carriers may be generally rectangular and have four generally upwardly extending side walls for retaining the refuse container on the carrier. The conventional refuse container carrier may contain a variety of hooks, bolts and other members which are used to secure together two like carriers, for ease in transportation of the refuse containers.

While the aforementioned carriers may have worked well in the past, several deficiencies make their use for the future less than satisfactory. First, it is often undesirable for a user to have direct hand contact with the carriers due to their unsanitary nature. While some of the conventional carriers provide for securing means for attaching together like carriers, the securing means must be activated and controlled by a user's hands. Specifically, a user has to bend down and secure the carriers together manually, thereby coming into direct contact with accumulated dirt and other contaminants on the carrier. In addition, certain users with physical limitations would be unable to perform such a task as manually securing together the carriers.

Second, the conventional carriers often require a user to lift a refuse container over upwardly extending side and front walls which retain the refuse container securely on the carrier. The carriers also may include a variety of retaining means, which must be activated by a user's hand, for assisting in retaining together the container and carrier. The additional lifting and/or necessity of manually providing retaining means for the container and carrier requires the user to expend additional energy and time.

SUMMARY OF THE PRESENT INVENTION

The present invention overcomes the aforementioned deficiencies by providing a refuse container carrier assembly having enhanced features which increase the convenience, safety and ergonomics of the refuse container carrier. The refuse container carrier is configured having a platform body which is generally of a rectangular shape. The platform body is supported by a plurality of wheels or casters secured to an underside of the body. The platform body is defined by three walls, namely a first and second side wall and a rear wall, which extend in a generally upwardly direction from the platform body. In addition, a front wall forms a ramp which allows a user to essentially drag the refuse container onto the carrier as opposed to lifting the refuse container onto the carrier. The carrier also includes a unique locking assembly which allows a user to easily interlock a carrier with similar like carriers, while minimizing the user's direct contact with the carriers.

Specifically, the locking assembly consists of locking members disposed adjacent to a front and rear portion of the carrier's first and second side walls. The first locking member, disposed adjacent the first side wall front portion, is a moveable hook. The second locking member, disposed adjacent the second side wall front portion, is a receiving member for receiving a hook from a like carrier. The rear portions of the carriers also contain locking members, used to secure the carrier to like carriers. Specifically, the carrier contains a third locking member disposed adjacent the first side wall rear portion and a fourth locking member disposed adjacent a rear portion of the second side wall. The third and fourth locking members are designed to interlock with each other when two carriers are positioned at a particular orientation to one another.

The first and second locking members may be easily disengaged from their corresponding receiving member by depressing a foot pedal disposed adjacent the carrier front wall. Therefore, the foot pedal provides the user with easy control of a portion of the locking assembly, which allows for easy detachment of like carriers. Once the carriers' front portion have separated, the refuse containers may be used to maneuver the carriers such that the carriers' rear portions will easily separate. The user can easily reattach the carriers by maneuvering the carriers, via the refuse containers, such that the carriers occupy a position such that the third and fourth locking members can easily interlock. The carriers may then be positioned approximately side to side and the first and second locking means will interlock producing an audible click. Thus the locking assembly provides for a detachment and attachment means which do not require a user to have direct hand contact with the carriers, and is positively assured by an audible click and visible securement of the latching members.

Accordingly, it is an objective of the present invention to provide a refuse container carrier assembly having an improved mechanism for attaching and securing together like carriers.

A further objective is to provide a refuse container carrier assembly having a ramp, and an improved ergonomic shape for enhanced convenience and utility.

A still further objective is to provide a refuse container carrier assembly that can be attached and detached to a similar like carrier without the user having direct hand contact with the carrier, or bending to secure the carriers together.

It is another objective to provide a refuse container carrier assembly having an improved mechanism for attaching and securing together like carriers, wherein the mechanism contains a foot activated pedal for assisting in partially separating the carriers.

Yet another objective is to provide a refuse container carrier assembly having an improved mechanism for attaching and securing together like carriers, which is easy and convenient to use and is not degraded through use.

An additional objective is to provide a refuse container carrier assembly that is economically and readily produced, readily assembled and convenient in operation.

These and other objectives, which will be apparent to those skilled in the art, are achieved by a preferred embodiment that is described in detail below and which is illustrated by the accompanying drawings.

DESCRIPTION OF THE ACCOMPANYING DRAWINGS

DESCRIPTION OF THE PREFERRED EMBODIMENT

Figure 1:
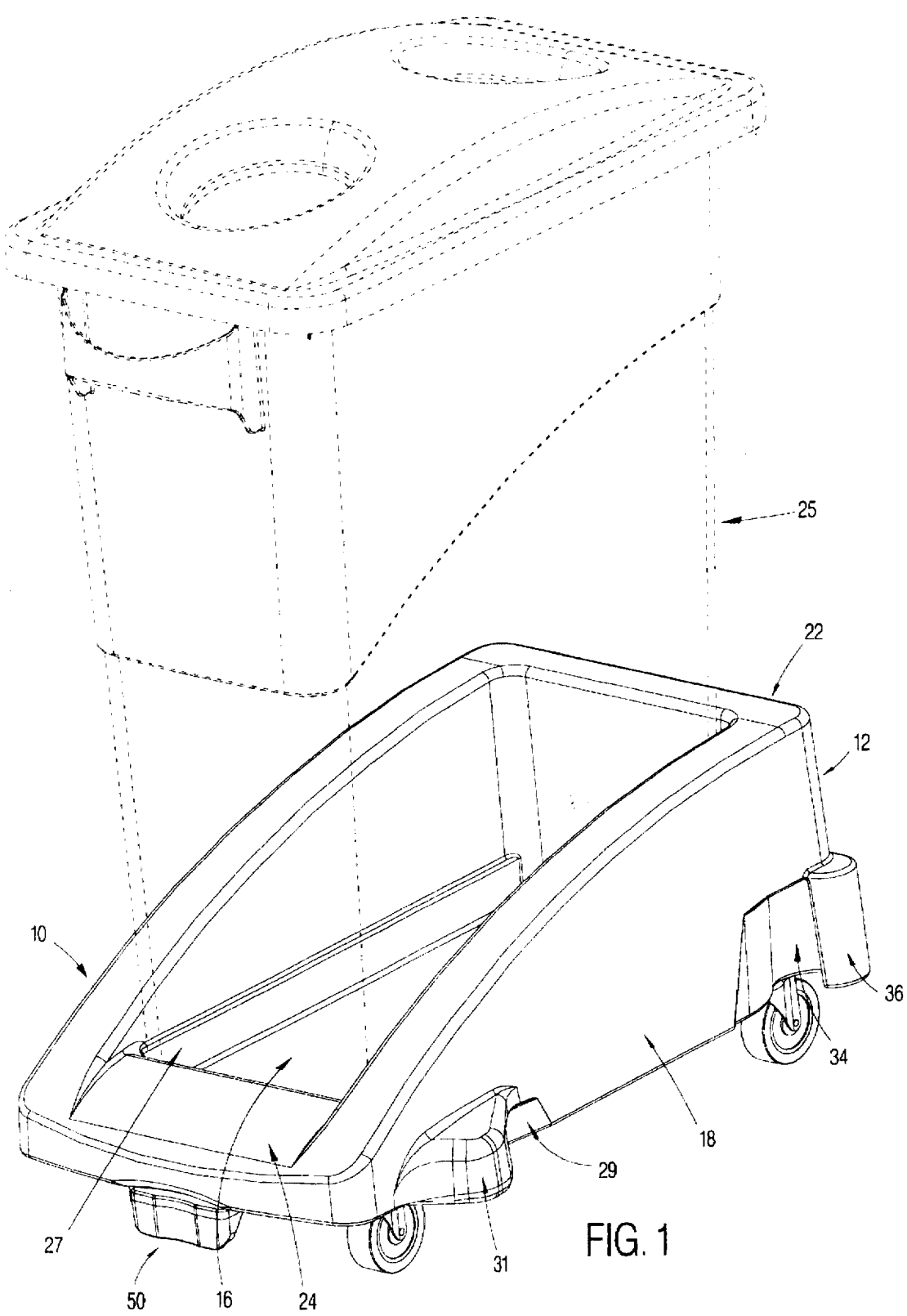
FIG. 1 is a side perspective view of the subject refuse container carrier assembly illustrating the first side wall of the carrier.

Referring first to FIGS. 1–4, the subject refuse container carrier assembly designated generally by the reference numeral 10 comprises a platform body 12 consisting of a generally flat base 16, and three upstanding walls, namely a first side wall 18, second side wall 20 and a rear wall 22. The height of the first 18 and second 20 side walls is not uniform, but rather gradually inclines such that the height of the rear portion of each of the side walls 18 and 20 is preferably equal to the height of the rear wall 22. In the preferred embodiment, the height of the rear wall 22 and the maximum height of the side walls 18 and 20 is approximately between six and ten inches, and in the preferred embodiment approximately eight inches. The height of the side walls 18 and 20, and the rear wall 22 is such that a refuse container 25 (shown in phantom in FIG. 1) will remain firmly confined within the platform body 12. The height of the front wall 24 is minimal and essentially creates a ramp, which allows a user to easily pull the refuse container 25 onto the platform body 12 as opposed to lifting the refuse container 25 over any upwardly extending walls. Despite the minimal height of the front wall 24, the front wall 24 has a tapered height such that the refuse container 25 must be lifted up slightly in order to remove the refuse container 25 from the platform body 12. In addition, the bottom portion 27 of each of the first 18 and second 20 side walls is tapered inwardly, towards the center of the platform body 12, thereby allowing refuse containers 25 of various sizes to be snugly retained within the carrier 10. Thus, the shape of the front wall 24, and the side walls 18 and 20 prevents the refuse container 25 from being inadvertently removed from the carrier 10. In the preferred embodiment the height of the front wall 24 ranges approximately between 0.5 and 1.5 inches, and the height of the side walls 18 and 20 ranges approximately between 6 and 10 inches.

The carrier 10 includes a unique locking assembly which allows first and second like carriers 10a to be easily attached and detached from the subject carrier 10. The locking assembly consists of various locking means disposed adjacent the first 18 and second 20 carrier side walls. Specifically, first locking means are disposed adjacent a front portion of the first side wall 18. The first locking means is comprised of an arm member 26 extending in a generally outwardly direction from the first side wall 18. As clearly illustrated in FIGS. 5 and 6, the front portion 28 of the arm member 26 is generally L shaped and resembles a hook. A generally L shaped recess 29 is disposed adjacent a front portion of the second side wall 20, and is considered the second locking means. A projection 31 is located adjacent to the recess 29 and assists in securing together the carrier and a like carrier. In addition, the recess 29 is sized to receive the arm member front portion 28 of a like carrier 10a, as illustrated in FIG. 7, and as will be discussed later. In addition, the arm member front portion 28 of the like carrier 10a is sized to be received in a recess in a second like carrier (not illustrated).

While the dimensions of the arm member 26 and the arm member front portion 28 may vary, in the preferred embodiment, the arm member 26 extends in an outwardly direction between approximately 1 and 3 inches from a recessed lowermost portion 30 of the carrier first side wall 18. The first side wall lowermost portion 30 is recessed and tapers in an inwardly direction approximately between two positions, approximately adjacent to the location where the arm member 26 protrudes in an outwardly direction from the first side wall 18 and the position of the third locking means, disposed adjacent a rear portion of the first side wall 18. The carrier first side wall lowermost portion 30 is recessed to ensure a protruding lowermost portion 33 of a like carrier 10a may be selectively received by the carrier recess 34, thereby closely securing together the like carrier 10a and carrier.

Figure 2:
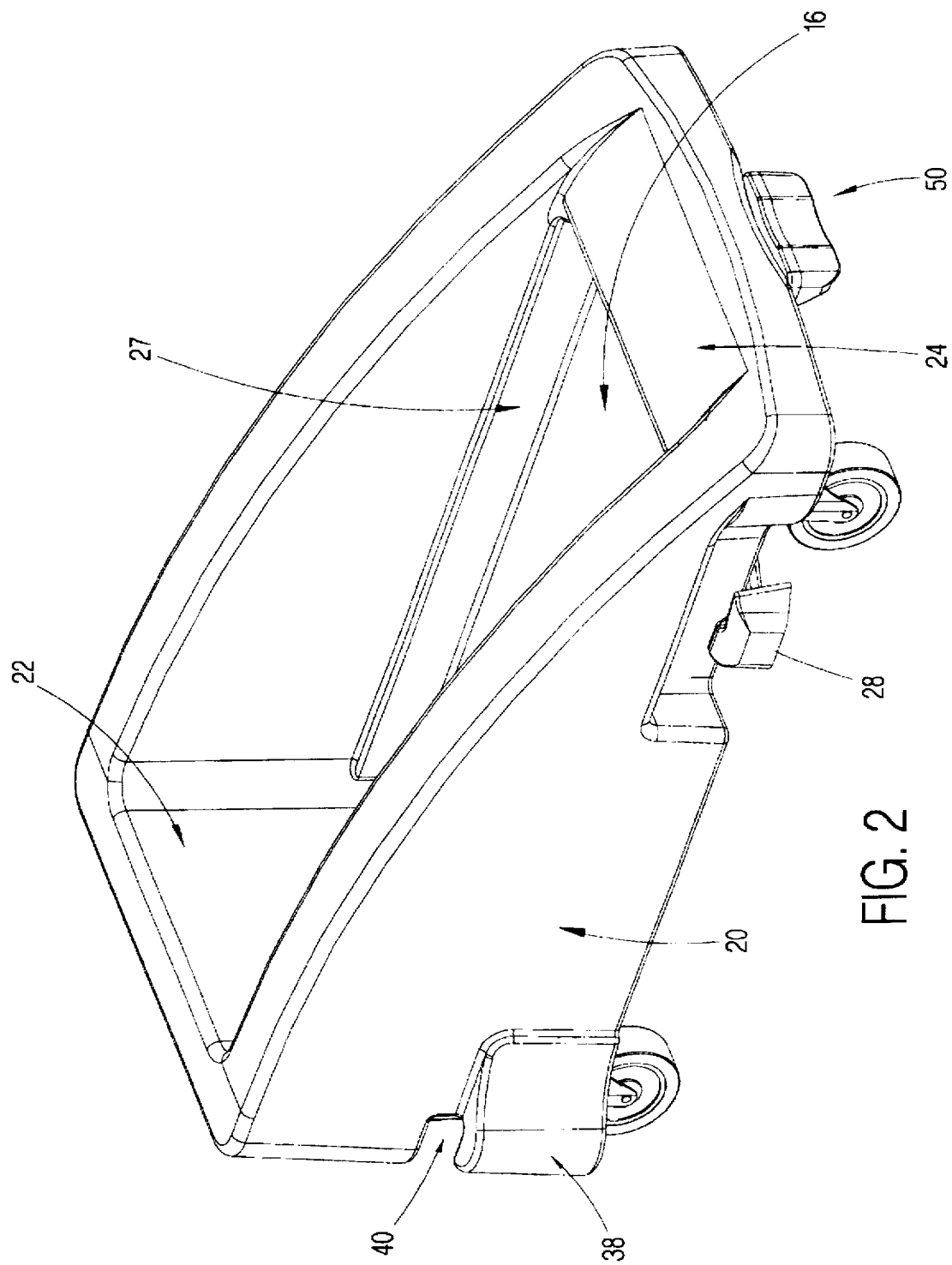
FIG. 2 is a side perspective view of the subject carrier illustrating the second side wall of the carrier.
Figure 3:
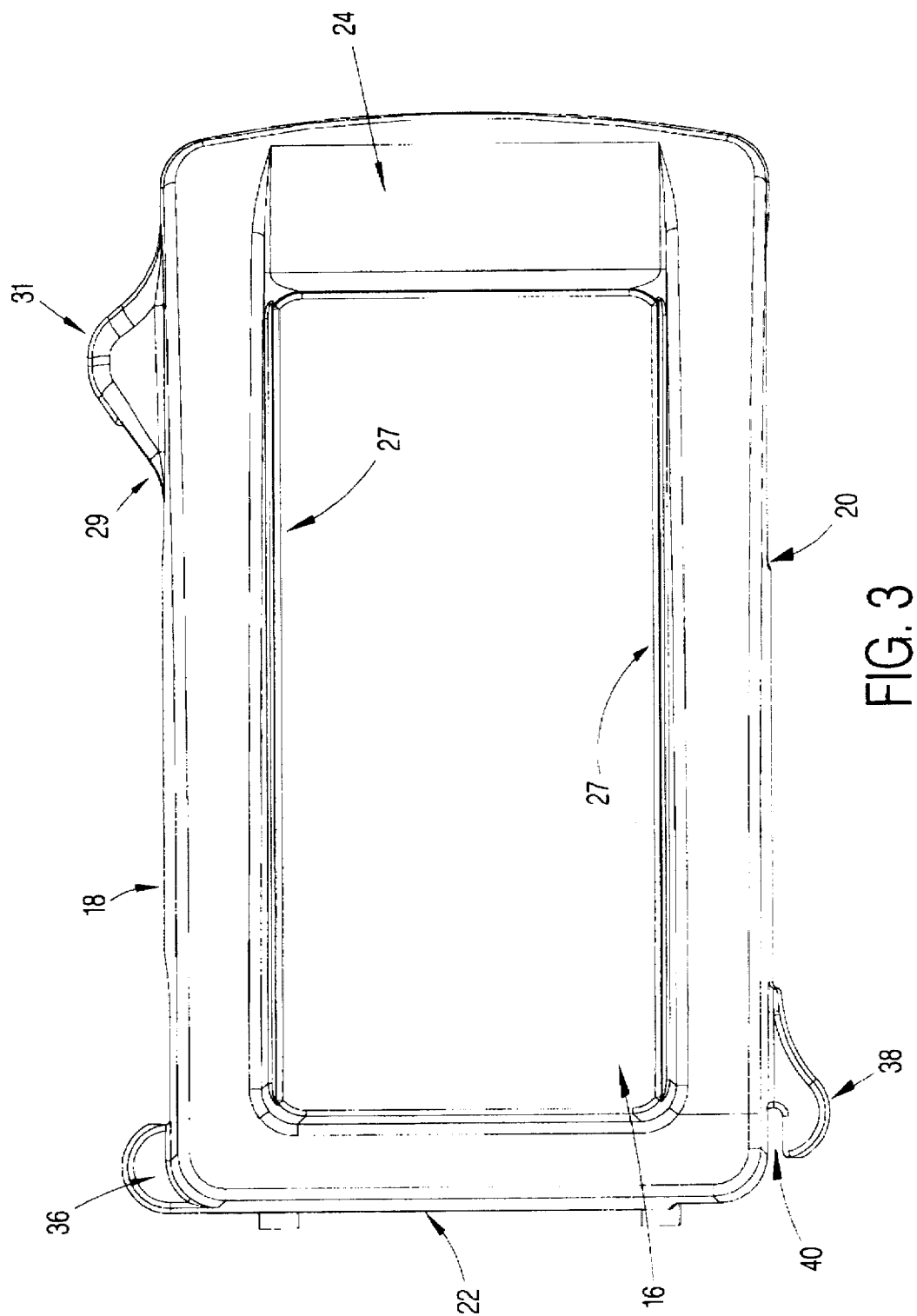
FIG. 3 is a top plan view of the subject carrier.
Figure 5:
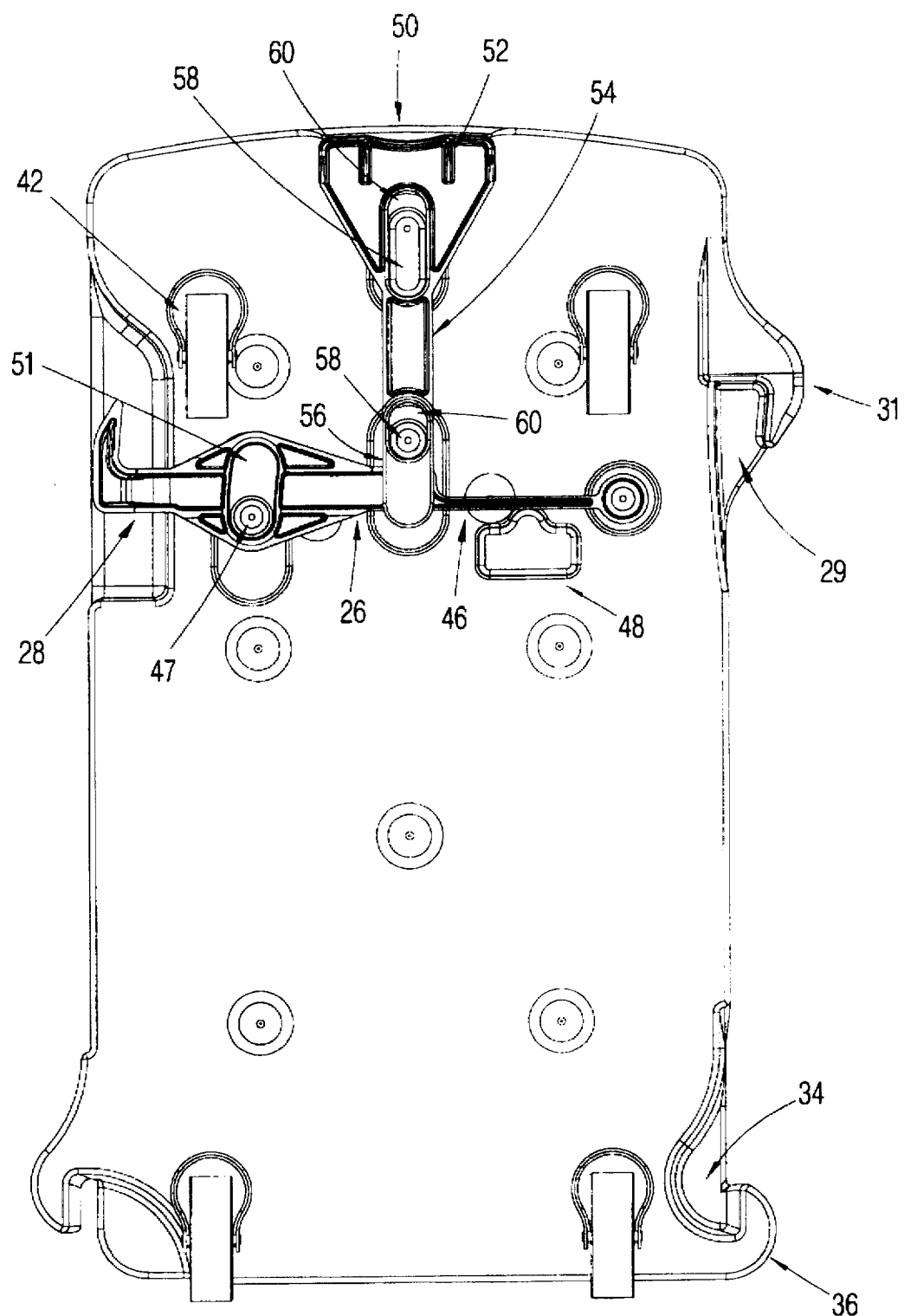
FIG. 5 is a bottom plan view of the subject carrier.

The third locking means generally consists of a generally C shaped recess 34, disposed adjacent the first side wall 18 rear portion as illustrated in FIGS. 1 and 5, and a first projection 36 extending in an outwardly direction from the first side wall 18 approximately adjacent to the recess 34. A fourth locking means is disposed adjacent a rear portion of the carrier second side wall 20, as illustrated in FIGS. 2 and 5. The fourth locking means includes a second projection 38 protruding in an outwardly direction from the second side wall 20, and a notch or recess 40 located adjacent to the second projection 38, disposed approximately adjacent the rear wall 22.

Another embodiment of the locking assembly could consist of the first and second locking means disposed adjacent to the first 18 and second 20 side walls respectively. The first and second locking means could consist of the generally L shaped arm member 26 disposed adjacent to the first side wall 18 or another type of locking means which could be received in the second side wall 20 of a like carrier 10a. In this embodiment of the invention, there would not be a need for third and fourth locking means. The foot pedal 50 (as will be discussed later) would continue to selectively disengage the carrier 10 and like carrier 10a.

As most clearly illustrated in FIGS. 4–7, the carriers 10 and like carriers 10a are provided with wheels or casters 42 secured to the underside of the carrier platform body 12 using bolts or screws, thereby providing the carriers 10 and 10a with mobility. Alternatively stem type casters could be used, whereby the stem portion of the casters could be retained in apertures in the underside of the platform body 12. Each of the four casters 42 swivel a full 360 degrees, thereby providing the carriers 10 and 10a with full mobility.

Figure 4:
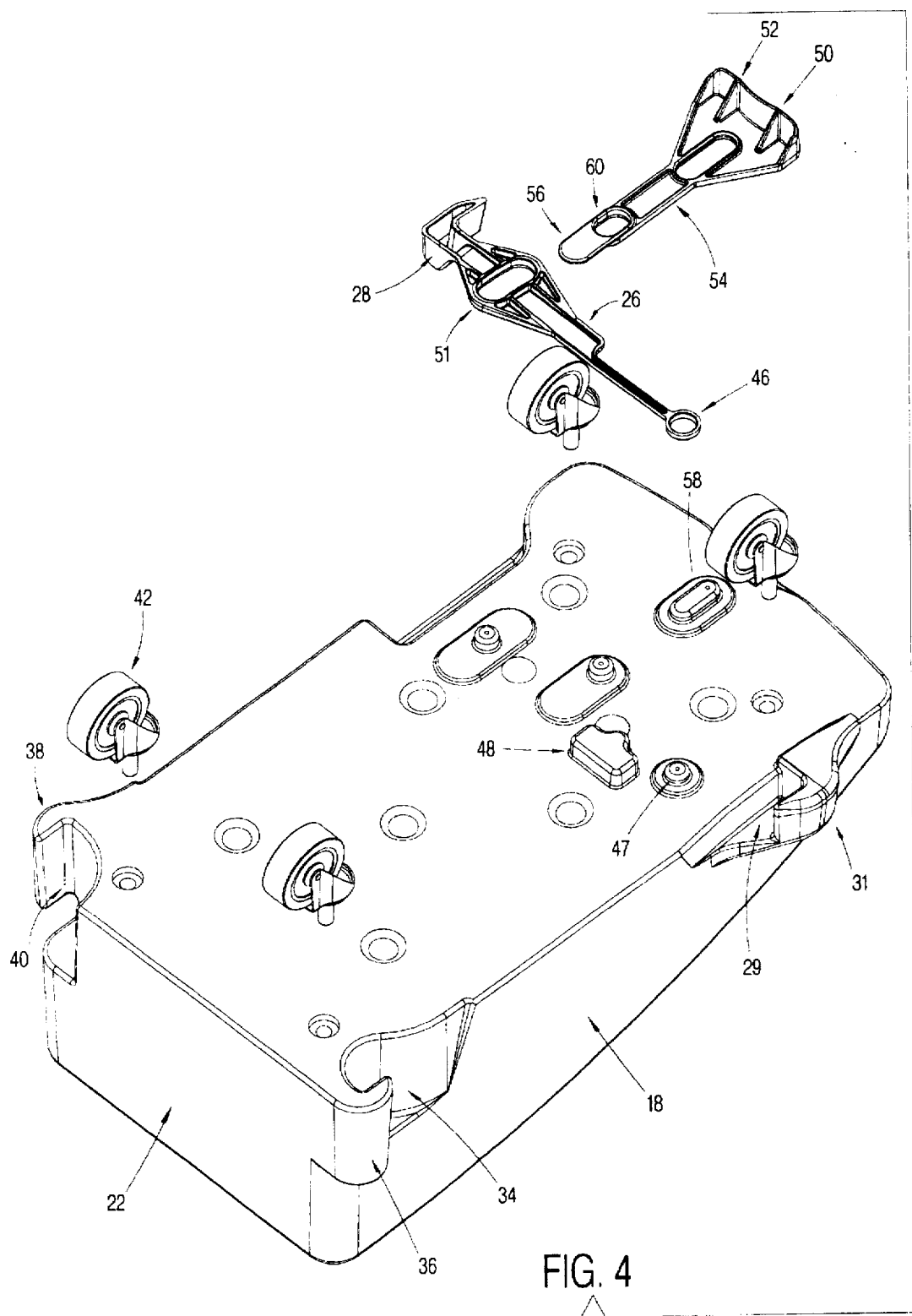
FIG. 4 is an exploded perspective bottom view of the subject carrier.

The arm member 26 is also secured to the underside of the carrier 10. Specifically, the arm member rear portion 46 is secured to the underside of the platform body 12, approximately adjacent to one of the casters 42. The arm member rear portion 46 may be secured to the underside of the carrier 10 using a variety of securing means including bolts, screws, and washers. The arm member 26 may be a one piece member or alternatively two or more separate members secured or integrally molded together. In the preferred embodiment, as illustrated in FIGS. 4 and 5, the arm member 26 is a one piece member having a rear portion 46 and a front portion 28. The front portion 28 is slideably secured to the underside of the carrier 10 via a projection 47 which is secured to the underside of the carrier and is retained within a slot 51 within the arm member front portion 28. This securing means allows the arm member from portion 28 to slideably move between positions, thereby allowing the arm member 26 the ability to release or secure a like carrier 10a. The arm member rear portion 46 is also secured to the underside of the carrier 10, and may be secured by a variety of means including nuts, bolts and screws.

The arm member rear portion 46 and front portion 28 have different dimensions, in part due to the different functions they perform. The arm member rear portion 46 generally has smaller dimensions for width and height as compared to the arm member front portion 28, to provide the arm member 26 with proper flexibility. The length of the arm member 26 ranges between approximately 8 and 11 inches, and the width ranges between approximately 0.25 and 2 inches, and the height ranges between approximately 0.25 and 1 inches. The arm member 26 is preferably constructed of nylon which has an elastic memory such that the arm member 26 can move and bend, and retain its original shape. One of the primary functions of the arm member rear portion 46 is to act as a pivot for the arm member 26. One of the primary functions of the arm member front portion 28 is to assist in securing together the carrier 10 and like carrier 10a, as illustrated in FIG. 7.

FIGS. 4 and 5 also illustrate a projection 48 protruding from the underside of the platform body 12. The projection 48 is oriented such that the approximate center of the arm member rear portion 46 is directly contacting the approximate center of the projection 48. Therefore, the projection 48 assists in controlling the arm member 26 movement once the user depresses a foot pedal 50. In the preferred embodiment the foot pedal 50 consists of a one piece member, however numerous members could be secured together to function similar to and be utilized as a foot pedal 50. In addition, the arm member 26 and the foot pedal 50 may also be constructed as one piece or numerous pieces secured together.

Figure 6:
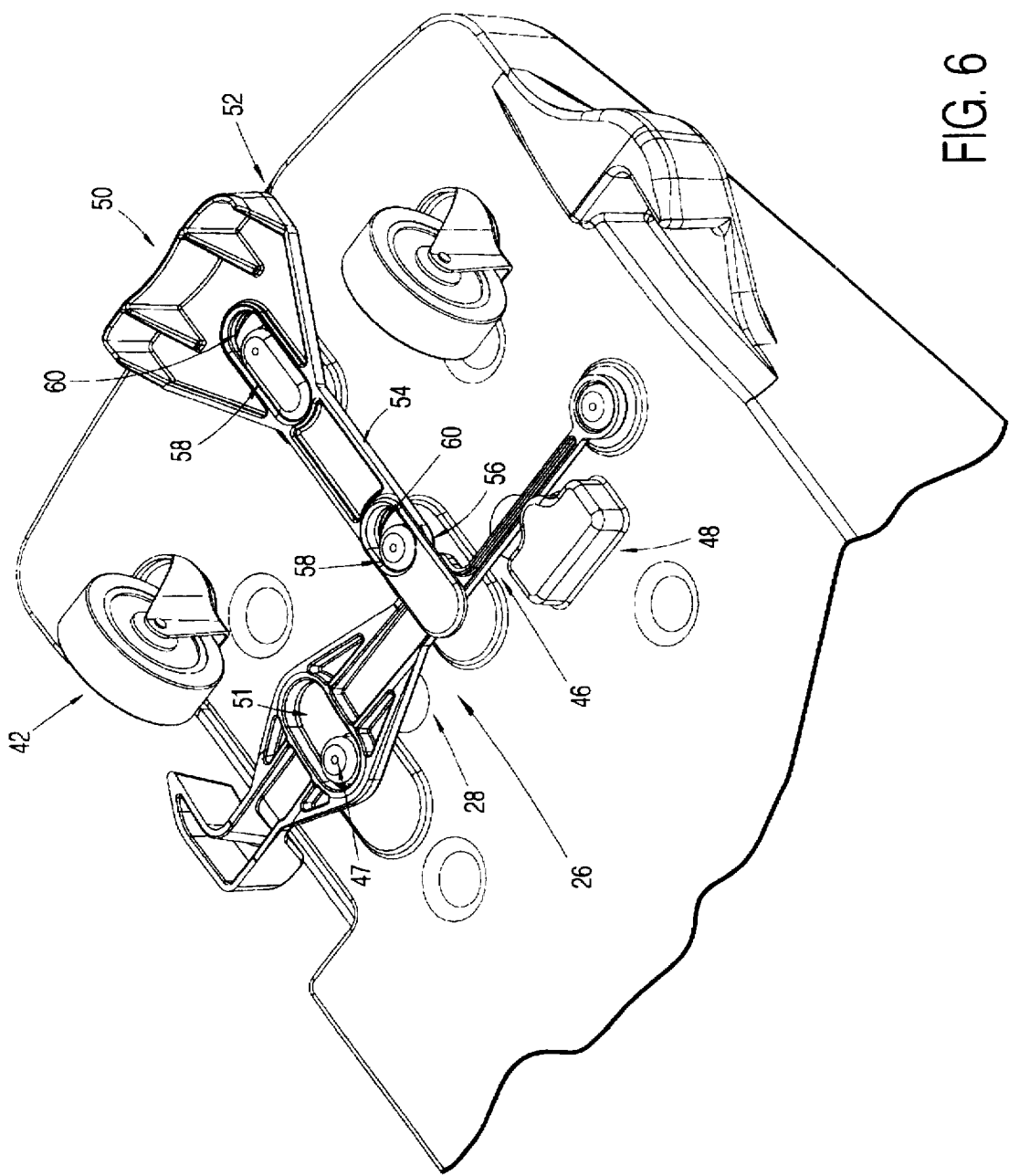
FIG. 6 is a perspective view of the arm member and foot pedal assembly of the subject carrier.
Figure 7:
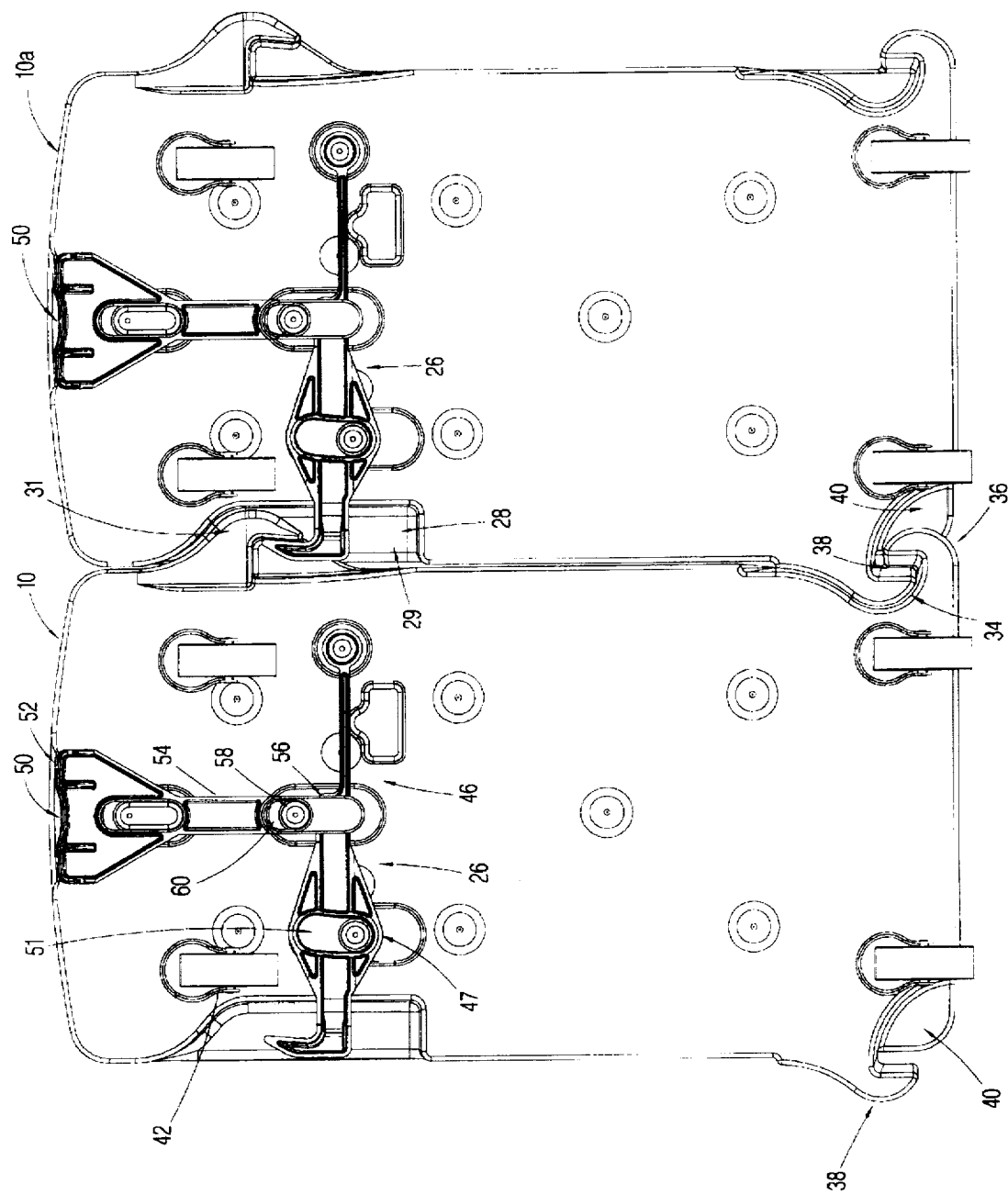
FIG. 7 is a bottom view of the subject carrier secured to a like carrier.
Figure 8:
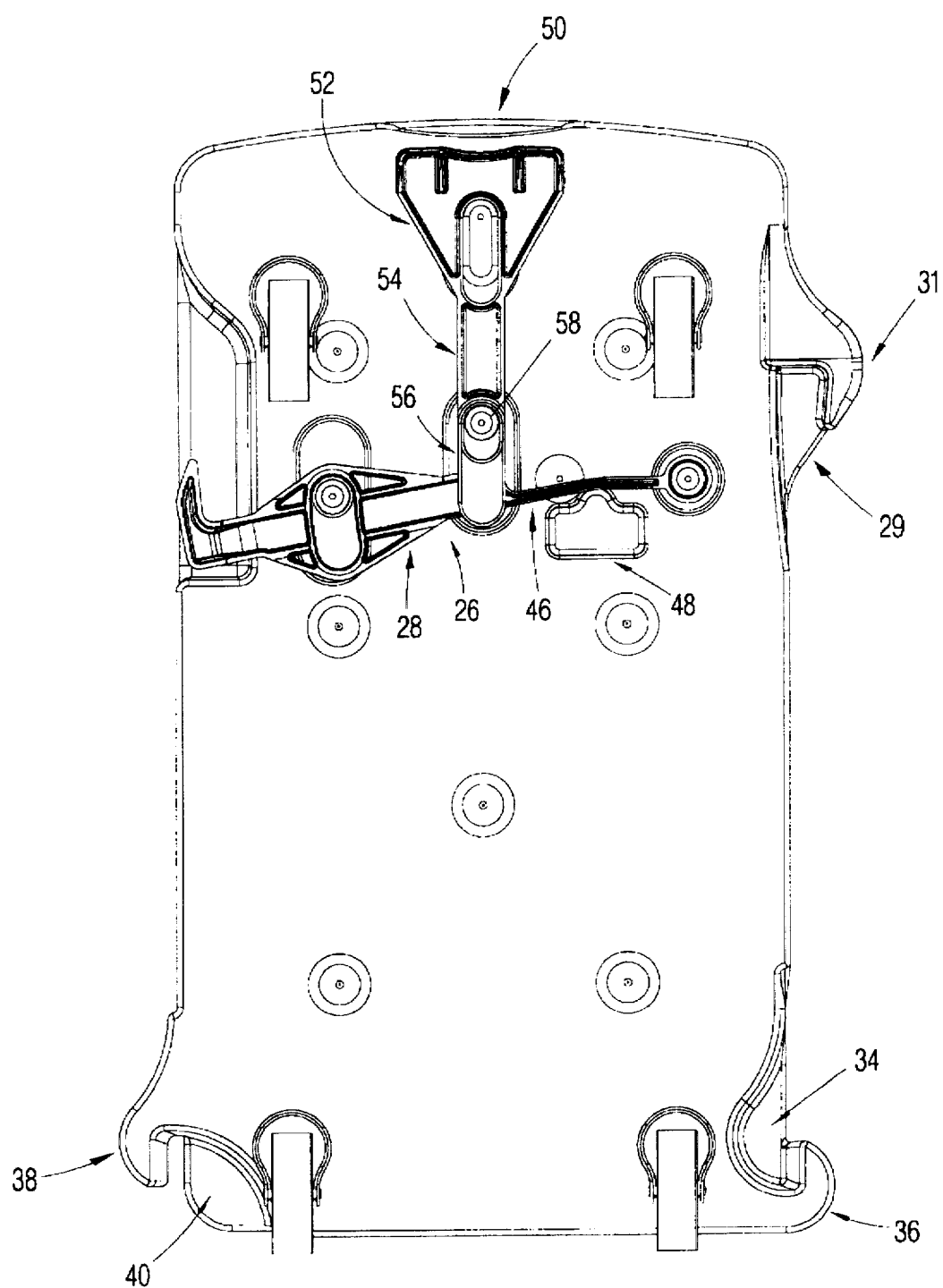
FIG. 8 is a bottom view of the subject carrier after the foot pedal has been depressed.

As illustrated in FIGS. 4, 5 and 6 the foot pedal 50 generally consists of a front portion 52 disposed adjacent the front wall 24, an intermediate portion 54 and a rear portion 56. The front 52, rear 56 and intermediate 54 portions may be integrally molded as one piece or secured together by a variety of securing means including but not limited to nuts, bolts, and screws. A user may control the movement of the arm member 26 and ultimately the timing of the detachment of the carrier 10 and like carrier 10a, by selectively controlling when pressure will be exerted against a foot pedal front portion 52. As illustrated in FIGS. 5 and 6, the foot pedal intermediate portion 54 is secured to the underside of the platform body 12 at one or more locations. In the preferred embodiment the foot pedal intermediate portion 54 is secured to the underside at two locations. The foot pedal rear portion 56 is oriented approximately adjacent to the arm member 26 and will directly contact the arm member in response to the force applied to the foot pedal front portion 52, as illustrated in FIGS. 7 and 8. The foot pedal 50 and the arm member 26 are both preferably constructed of nylon material in an attempt to lessen friction and cause less wear between the members. The foot pedal intermediate portion 54 may also be slideably secured to the carrier underside by a variety of means including projections 58, or self threading screws and washer. The projections 58 is slideably retained within slots 60 disposed within the front 52 and/or intermediate 54 portions of the foot pedal, thereby limiting the movement of the foot pedal 50 to the size of the slot 60. Therefore, the foot pedal 50 can slideably move between at least two positions, as more clearly illustrated in FIGS. 7 and 8, and thereby assist in controlling the detachment of the carrier 10 and like carrier 10a. In the preferred embodiment, the length of the foot pedal 50 ranges between approximately 5 and 8 inches, and the width ranges between approximately 0.5 and 4 inches, and the height ranges between approximately 0.5 and 3 inches.

The user may easily selectively separate the carrier 10 and like carrier 10a. To separate the carriers without any user hand contact with the carriers, the user must exert a slight outward pressure on the containers 25 while simultaneously depressing the carrier foot pedal 50. As the foot pedal front portion 52 is depressed, the foot pedal 50 slideably moves in a rearwardly direction towards the rear wall 22. The sliding movement of the foot pedal 50 is limited by the slot or opening 60 size. When the foot pedal 50 is at its most rearward portion the foot pedal rear portion 56 is exerting pressure against the arm member front portion 28. In addition, the sliding movement of the foot pedal 50 also causes the arm member rear portion 46 to conform its shape to that of the projection 48. Both of these events cause the arm member front portion 28 to move in a generally rearwardly direction, limited by the size of the slot 51. Therefore, as the arm member front portion 28 moves in a generally rearwardly direction it subsequently becomes disengaged from the recess 29, disposed in the second side wall 20 of a first like carrier 10a. Thus the front portions of the carriers 10 and 10a as illustrated in FIGS. 7 and 8, are easily disengaged. The foot pedal rear portion 56 extend over the arm member 26 and thereby assists in preventing vertical movement of the arm member 26 and limiting the movement of the arm member 26 to horizontal movement. The foot pedal rear portion 56 may be of a variety of lengths and widths, however, in the preferred embodiment the length of the foot pedal rear portion 56 approximately between 0.5 and 2.5 inches.

Figure 9:
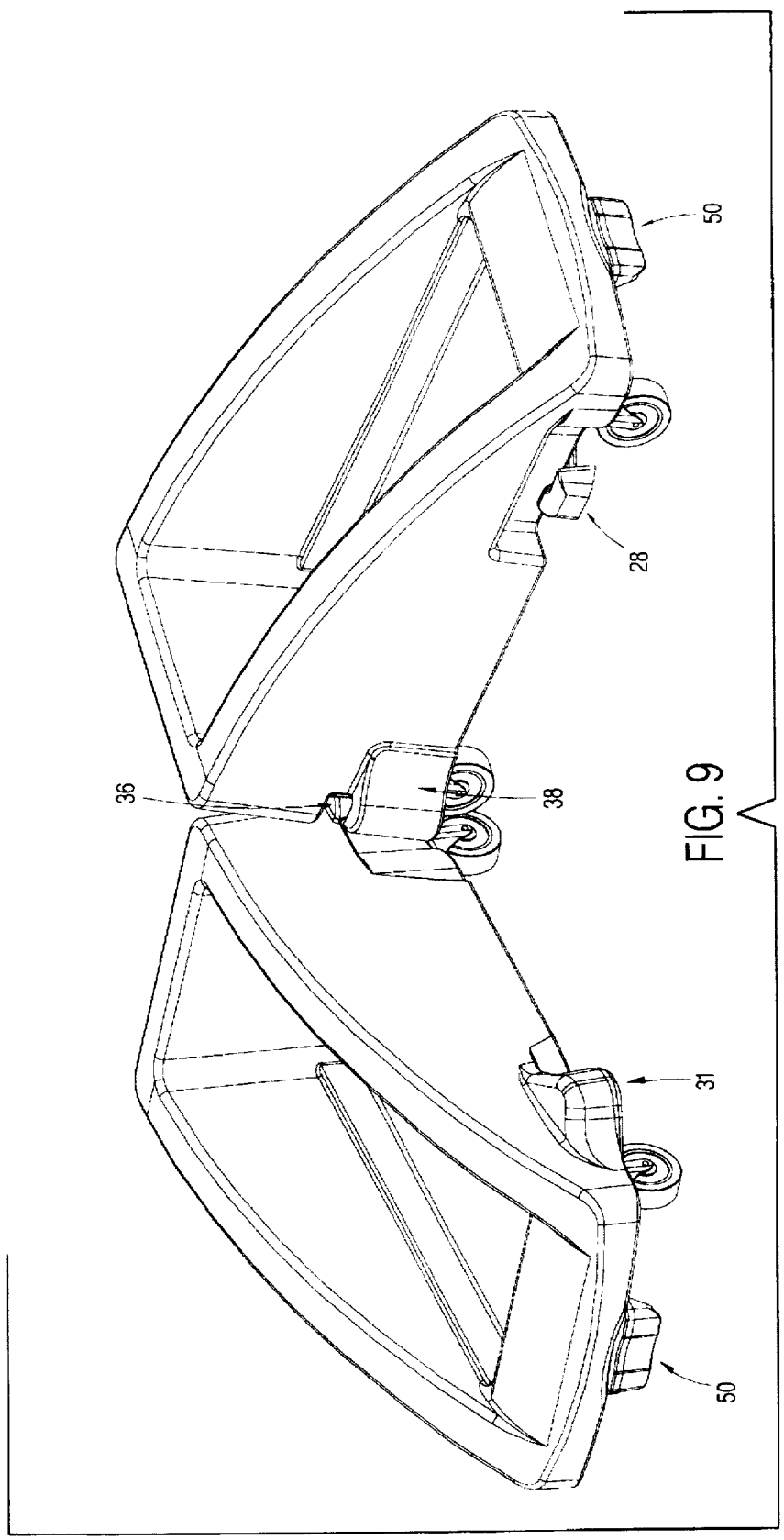
FIG. 9 is a from perspective view of the rear portions of the subject carrier secured to a like carrier.

To completely disengage the carriers 10 and 10a, the rear portions of the carriers must be disengaged. As illustrated in FIGS. 7-9, the first 36 and second 38 projections, and the corresponding recesses 40 and 34 are sized such that the projections may easily mate within the recesses. Therefore, the first 36 and second 38 projections interlock, providing for connection between the rear portions of the two carriers 10 and 10a. Even though the front portions of the carriers 10 and 10a are disconnected, the carriers can still be moved together for short distances provided the carrier's 10 first side wall 18 is approximately parallel to the like carrier's 10a second side wall 20.

Figure 10:
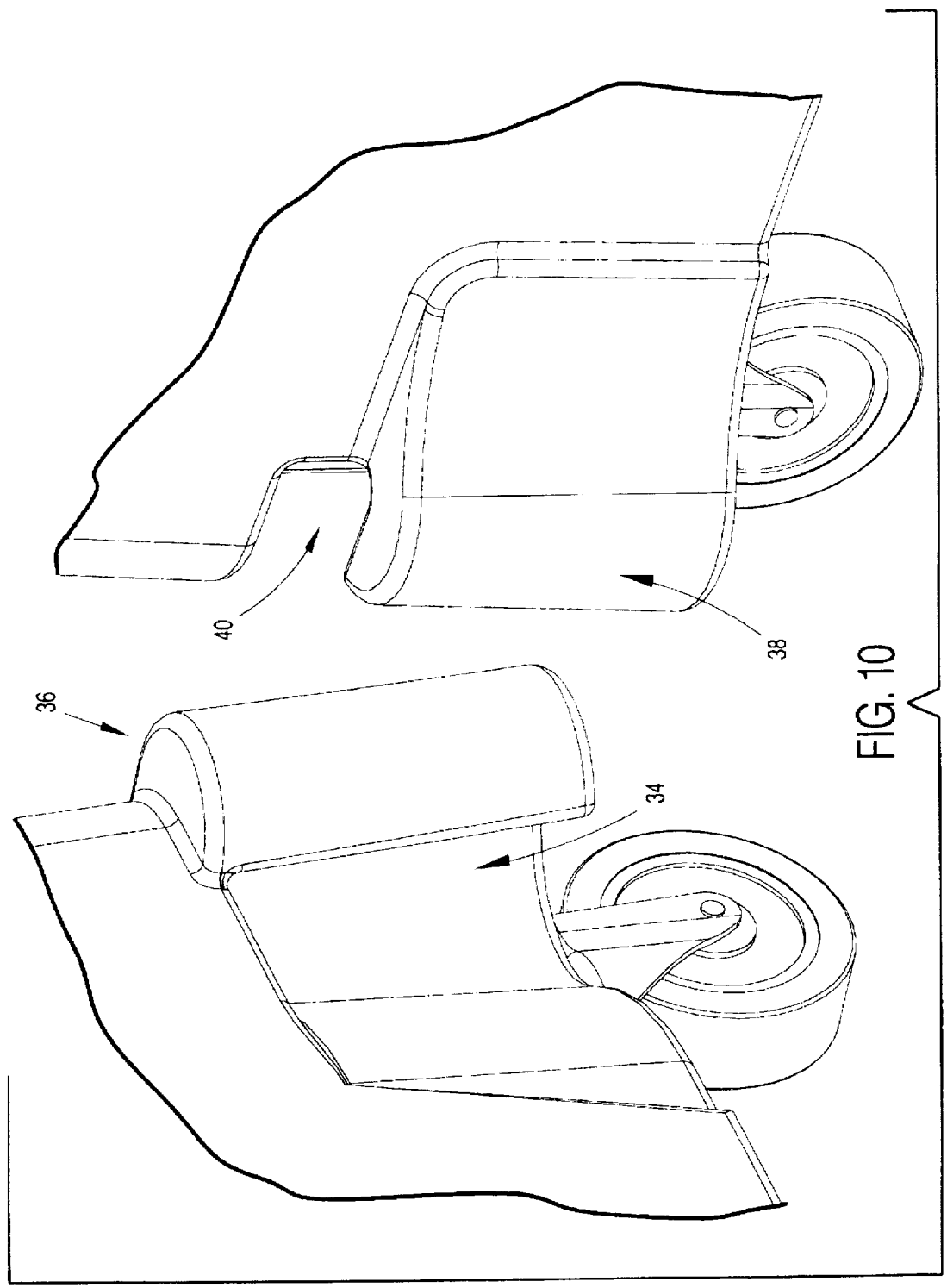
FIG. 10 is an exploded partial front perspective view of the rear portions of an unsecured carrier and like carrier.

Despite the ability of the carriers 10 and 10a to move together over short distances, it will be relatively easy for the user to separate the two carriers 10 and 10a without the requirement of user direct hand contact with the carriers 10 and 10a. The carriers 10 and 10a are easily maneuverable by using the refuse containers 25 as guides for the carriers. Therefore to completely separate the carriers 10 and 10a, the carriers should be oriented similar to the orientation depicted in FIG. 9, such that the rear portions of the carriers 10 and 10a are oriented approximately between 10 and 90 degrees with respect to each other, preferably approximately between 25–45 degrees. When the carriers 10 and 10a are oriented in this position, the first 36 and second 38 projections are easily separated from their respective recesses 40 and 34. The carriers, via the refuse containers 25, may be easily separated from each other as illustrated in FIG. 10.

Figure 11:
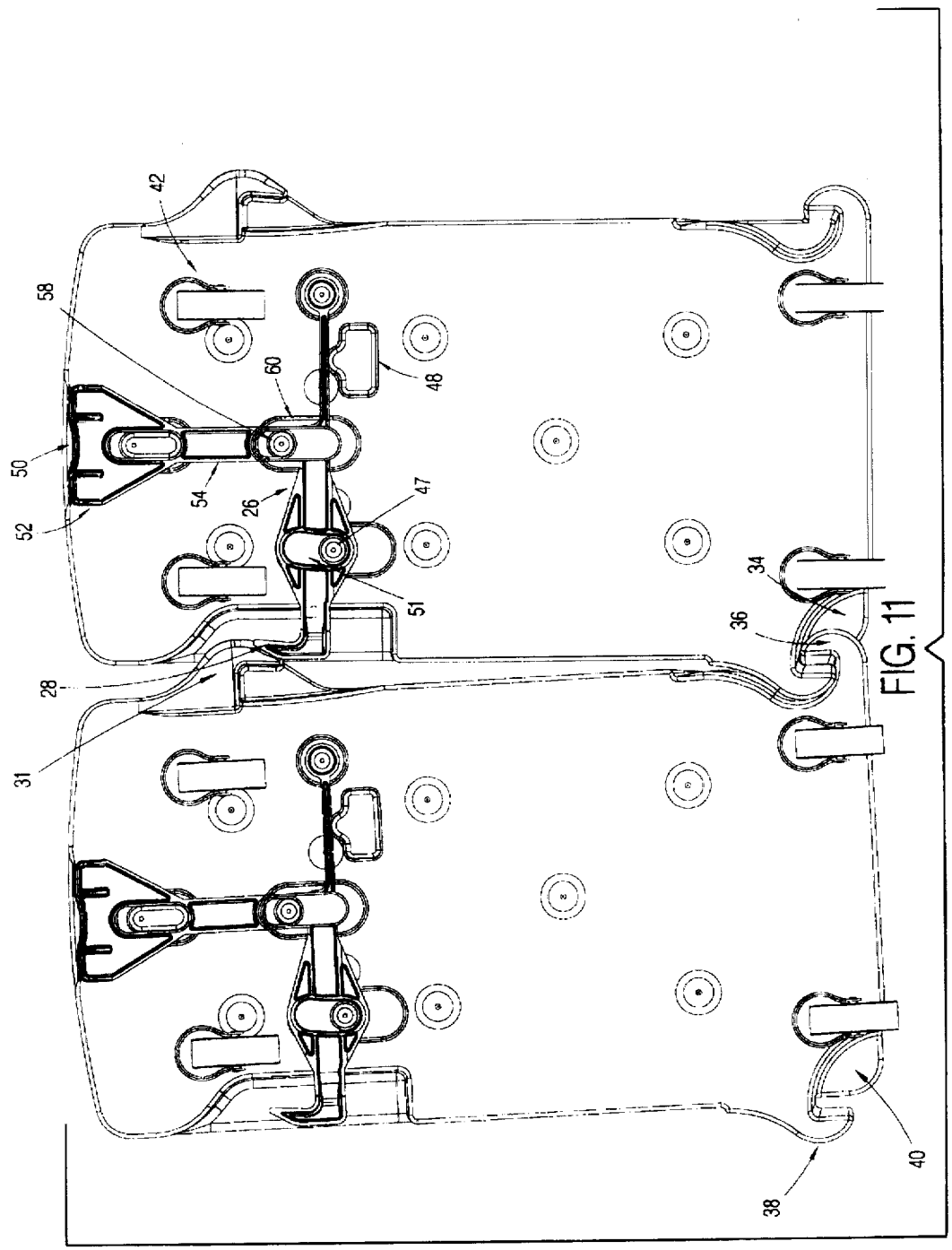
FIG. 11 is a bottom view of the carrier partially secured to a like carrier.

Just as the carriers 10 and 10a are easily separated, they also are easily attached without the necessity of direct hand contact with either of the carriers. The user may attach two carriers 10 and 10a together by maneuvering the carriers 10 and 10a, via the refuse containers 25, such that the carriers 10 and 10a are oriented in a position similar to the carriers depicted in FIG. 9. The carriers 10 and 10a should be oriented such that the rear portions are approximately between 10–90 degrees with respect to each other, preferably approximately between 20–45 degrees. When the carriers are in this orientation, the first 36 and second 38 projections can be easily inserted into the respective recesses 40 and 34 of the like carrier 10a or carrier 10, thereby locking together the carriers' rear portions. Once the rear portions are locked together, the carriers should be oriented such that the carrier first side wall 18 is approximately parallel to the like carrier 10a second side wall 20. As illustrated in FIG. 11, as the carriers 10 and 10a are oriented in this position, the arm member front portion 28 will initially contact the exterior of the generally L shaped recess 29 oriented in the second side wall of the like carrier 10a. This contact and the lateral pressure of the projection 61 will cause the arm member 26 and arm member front portion 28 to move in a generally rearwardly direction. As the arm member front portion 28 moves in a generally rearwardly direction, the arm member rear portion 46 conforms to the shape of the projection 48. The projection 48 eventually causes the arm member 26 to spring in a forwardly direction such that the arm member front portion 28 is retained in the recess 29 and the carriers are locked together. Once the arm member front portion 28 is retained within the recess 29, the carriers 10 and 10 can only be separated if the user exerts force on the foot pedal 50. The depression of the foot pedal 50 will cause movement of the arm member 26 thereby causing separation of the carriers' front portions, as clearly described above.

The above described attachment and detachment method may be used to secure any number of like carriers in series thereby forming a train of carriers. The train of carriers will be suitable to transport refuse containers over a variety of surfaces and thresholds, including rough or inclined surfaces.

While the above describes the preferred embodiment of the subject invention, the invention is not intended to be so restricted. Other embodiments, which will be apparent to those skilled in the art, and which utilize the teachings herein set forth, are intended to be within the scope and spirit of the subject invention.

We claim:

1. A trash container carrier comprising:

a platform body for supporting a refuse container, said platform body having at least a base, a first and second side wall, and a front wall;

a plurality of wheels secured to an underside of said platform body, whereby said platform body is mobile;

first locking means and third locking means extending in an outwardly direction from said first side wall, and second locking means and fourth locking means disposed adjacent said second side wall, said first and said third locking means on said carrier for engaging and locking with second and fourth locking means on a like carrier;

said carrier further comprising: foot activated means disposed adjacent said front wall for disengaging said carrier first locking means and said like carrier second locking means in response to movement of said foot activated means.

2. A trash container carrier according to claim 1, wherein said first and said second side walls extend in a generally upwardly direction.

3. A trash container carrier according to claim 1, wherein said carrier third locking means is separable from said like carrier's fourth locking means when said carrier is oriented between approximately ten and ninety degrees with respect to said like carrier.

4. A trash container according to claim 1, said first locking means further comprising a first hook member secured to said platform body, said hook member subject to movement in response to said foot activated means.

5. A trash container carrier according to claim 2, said carrier further comprising said platform body having a rear wall.

6. A trash container according to claim 4, wherein said foot activated means further comprising a pedal secured to said platform body adjacent said first hook member such that when said pedal is depressed said first hook member moves in a direction away from said front wall, and is released from said second locking means of said like carrier.

7. A trash container according to claim 5, wherein said first and said second side walls gradually taper to a height approximately equal to the height of said rear wall.

8. A trash container carrier comprising:

a platform body comprising a base, a first and a second side wall, and a front wall;

a plurality of wheels secured to an underside of said platform body, whereby said platform body is mobile;

first locking means disposed adjacent said first side wall and second locking means disposed adjacent said second side wall, said first and second locking means for engaging and locking together said carrier and like carriers; and a foot pedal mounted to said platform body coupled to the first and the second locking means and at least partially disengaging said carrier and said like carriers.

9. A trash container carrier according to claim 8, said carrier further comprising third locking means disposed adjacent said first side wall and fourth locking means disposed adjacent said second side wall, for assisting to engage and lock together said carrier and said like carriers.

10. A trash container carrier according to claim 9, said first locking means disposed adjacent a front portion of said first side wall and said second locking means disposed adjacent a front portion of said second side wall.

11. A trash container carrier according to claim 9, said second locking member further comprising a generally L shaped recess for receiving said first locking member, wherein said first locking member is a generally hook shaped member.

12. A trash container carrier according to claim 9, said third locking means disposed adjacent a rear portion of said first side wall and said fourth locking means disposed adjacent a rear portion of said second side wall.

13. A trash container carrier according to claim 9, said carrier further comprising attachment and detachment means for attaching and detaching said carrier and said like carriers without the user having direct hand contact with said carriers.

14. A trash container carrier comprising:

a platform body comprising a base, a first and a second side wall, and a front and a rear wall;

a plurality of wheels secured to an underside of said platform body, whereby said platform body is mobile;

first locking means disposed adjacent a front portion of said first side wall;

second locking means disposed adjacent a front portion of said second side wall;

third locking means disposed adjacent a rear portion of said first side wall;

fourth locking means disposed adjacent a rear portion of said second side wall; said first locking means for engaging and locking together with second locking means from a like carrier;

said third locking means for engaging and locking together with fourth locking means from said like carrier; and foot activated means, disposed adjacent said platform body, for disengaging said carrier first locking means and said like carrier second locking means.

15. A trash container carrier comprising:

a platform body comprising a base, a first side wall, a second side wall, a front wall and a rear wall;

a plurality of wheels secured to an underside of said platform body, whereby said platform body is mobile;

at least two locking means secured to said platform body for engaging and releasably locking said carrier to a like carrier; and a foot pedal member secured to said platform body coupled to disengage at least one of said locking means responsive to movement of said foot pedal member.

16. A trash container carrier according to claim 15, wherein said two locking means are disposed adjacent to said carrier first side wall.

17. A trash container carrier according to claim 16, wherein said two locking means engage and releasably lock with locking means disposed adjacent a second side wall wall said like carrier.

18. A trash container carrier comprising:

a platform body comprising a base, a first side wall, a second side wall, a front wall and a rear wall;

a plurality of wheels secured to an underside of said platform body, whereby said platform body is mobile;

first locking means disposed adjacent said first side wall for engagement with second locking means disposed adjacent a second side wall of a first like carrier; and a foot pedal member mounted to said platform body coupled to disengage said first and second locking means responsive to movement of said foot pedal member.

19. A trash container carrier according to claim 18, said carrier further comprising third locking means disposed adjacent a rear portion of said first side wall for engagement with fourth locking means disposed adjacent a rear portion of said second side wall of said first like container.

20. A trash container carrier according to claim 18, said first locking means comprising a first hook member extending in a generally outwardly direction from said first side wall, and sized to be received by said second locking means.

21. A trash container carrier according to claim 20, said second locking means further comprising a first recess disposed adjacent said second side wall of said first like container and sized to receive said first hook member.

22. A refuse container carrier comprising:

a platform body having a base for supporting a refuse container;

a plurality of wheels affixed to an underside of said platform body, whereby said platform is mobile;

said platform body further comprising locking means for establishing locking engagement between said carrier and a like carrier, said locking means responsive to horizontal movement of said carrier relative to said like carrier; and release means for assisting in at least partially separating said carrier and said like carrier in response to force applied to said release means;

said platform body further comprising a first side wall, and a second side wall, each of said walls extending in a generally upwardly direction from said base; and said carrier further comprising connection means allowing said carrier and said like carrier to be attached and separated without any direct hand contact by the user with said carrier or said like carrier.

23. A refuse container carrier according to claim 22, said connection means comprising said release means and separable interlocking means;

said separable interlocking means further comprising a first interlocking connector member disposed adjacent a first side wall of said carrier and a corresponding second interlocking member disposed adjacent a second side wall of one of said like carriers, for interlocking said carrier and said like carrier.

24. A refuse container carrier according to claim 23, wherein said interlocking members separate when said carrier is oriented between approximately ten and ninety degrees with respect to said like carrier.

25. A refuse container carrier comprising:

a platform body for supporting a refuse container;

a plurality of wheels affixed to an underside of said platform body, whereby said platform is mobile;

connection means disposed adjacent said platform body for allowing attachment and separation of said carrier and a like carrier without a user's hand contacting said carrier or said like carrier; and said container further comprising:

pedal means disposed adjacent said platform body for controlling a partial separation of said carrier and said like carrier.

26. A trash container transporter train assembly comprising:

a plurality of platform bodies supported on wheels, said platforms having a front portion and a rear portion;

means for coupling said platform bodies together;

foot activated means for at least partially decoupling said platform bodies, first locking means for coupling said platform bodies' front portions and second locking means for coupling said platform bodies' rear portions; and said first locking means and said second locking means further comprising means for coupling and decoupling said platform bodies without the requirement of user's hand contact with said platform bodies.

* * * * *

UNITED STATES PATENT AND TRADEMARK OFFICE
CERTIFICATE OF CORRECTION

PATENT NO. : 5,704,625
DATED : January 6, 1998
INVENTOR(S) : Donald C. Presnell, et al.

It is certified that error appears in the above-indentified patent and that said Letters Patent is hereby corrected as shown below:

Column 7, Line 34, delete the second number "10" and substitute therefor the number --10a--.

Column 3, Line 14, delete the word "from" and substitute therefor the word --front--.

Column 7, Line 24, delete the number "61" and substitute therefor the number --31--.

Signed and Sealed this

Fourth Day of August, 1998

*Attest:*

BRUCE LEHMAN

*Attesting Officer*  *Commissioner of Patents and Trademarks*